(12) United States Patent
Eckert et al.

(10) Patent No.: US 9,511,723 B2
(45) Date of Patent: Dec. 6, 2016

(54) METHOD AND DEVICE FOR AN ASSISTANCE SYSTEM IN A VEHICLE FOR PERFORMING AN AUTONOMOUS OR SEMI-AUTONOMOUS DRIVING MANEUVER

(75) Inventors: Alfred Eckert, Mainz-Hechtsheim (DE); Ronald Bayer, Muehlheim/Main (DE); Stefan Lueke, Bad Homburg (DE); Bernd Piller, Dreieich (DE); Georg Halasy-Wimmer, Vaihingen Enz (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 117 days.

(21) Appl. No.: 14/241,275

(22) PCT Filed: Aug. 21, 2012

(86) PCT No.: PCT/DE2012/100244
§ 371 (c)(1),
(2), (4) Date: Feb. 26, 2014

(87) PCT Pub. No.: WO2013/034140
PCT Pub. Date: Mar. 14, 2013

(65) Prior Publication Data
US 2014/0379197 A1   Dec. 25, 2014

(30) Foreign Application Priority Data
Sep. 8, 2011 (DE) .................. 10 2011 112 578

(51) Int. Cl.
*G01M 17/00* (2006.01)
*B60R 16/02* (2006.01)
(Continued)

(52) U.S. Cl.
CPC ............... *B60R 16/02* (2013.01); *B60R 16/00* (2013.01); *B60T 7/22* (2013.01); *B60W 30/06* (2013.01);
(Continued)

(58) Field of Classification Search
CPC ............... B60R 1/00; B60R 2001/1223; B60R 2001/1253; B60R 2300/105; B60R 2300/303
(Continued)

(56) References Cited

U.S. PATENT DOCUMENTS 6,564,123 B2    5/2003 Hahn et al.
6,919,917 B1 *  7/2005 Janssen .................. B60Q 9/005
                                                    348/143
(Continued)

FOREIGN PATENT DOCUMENTS

DE    101 17 650        10/2002
DE    102006036933      2/2008
(Continued)

OTHER PUBLICATIONS

International Search Report of the International Searching Authority for International Application PCT/DE2012/100244, mailed Nov. 26, 2012, 2 pages, European Patent Office, HV Rijswijk, Netherlands.
(Continued)

*Primary Examiner* — Redhwan k Mawari
(74) *Attorney, Agent, or Firm* — W. F. Fasse

(57) ABSTRACT

A method and a device for an assistance system, e.g. a parking assistance system, perform an autonomous or semi-autonomous driving maneuver of a vehicle. A camera system generates image data from the surroundings of the vehicle. A processor arrangement processes the image data to produce control information that is used by the assistance system to perform the driving maneuver. If the image data
(Continued)

show that a restriction or impediment is present, then the assistance system is put in a safe state.

11 Claims, 2 Drawing Sheets

(51) Int. Cl.
   *B60T 7/22*    (2006.01)
   *B62D 15/02*   (2006.01)
   *B60R 16/00*   (2006.01)
   *G06K 9/00*    (2006.01)
   *B60W 50/00*   (2006.01)
   *B60W 30/18*   (2012.01)
   *B60W 30/06*   (2006.01)
   *H04N 7/18*    (2006.01)

(52) U.S. Cl.
   CPC .......... *B60W 30/18* (2013.01); *B60W 50/0098* (2013.01); *B62D 15/0285* (2013.01); *G06K 9/00791* (2013.01); *G06K 9/00812* (2013.01); *H04N 7/18* (2013.01); *B60R 2300/80* (2013.01); *B60T 2201/10* (2013.01); *B60W 2420/42* (2013.01)

(58) Field of Classification Search
   USPC ...................................... 701/28, 70
   See application file for complete search history.

(56) References Cited

U.S. PATENT DOCUMENTS

| | | | | |
|---|---|---|---|---|
| 7,843,362 | B2 * | 11/2010 | Augst | B62D 15/027 340/435 |
| 9,001,204 | B2 | 4/2015 | Fukuda | |
| 2005/0264099 | A1 * | 12/2005 | Kamiya | B60T 7/22 303/15 |
| 2005/0270177 | A1 * | 12/2005 | Mori | B60T 7/12 340/932.2 |
| 2006/0080005 | A1 * | 4/2006 | Lee | B60Q 1/22 701/1 |
| 2008/0231701 | A1 * | 9/2008 | Greenwood | B60R 1/00 348/148 |
| 2009/0015736 | A1 * | 1/2009 | Weller | B60R 1/12 349/11 |
| 2009/0267750 | A1 * | 10/2009 | Konishi | G08G 1/163 340/435 |
| 2009/0323366 | A1 * | 12/2009 | Furusawa | B60Q 1/143 362/466 |
| 2010/0060487 | A1 * | 3/2010 | Augst | G06K 9/2036 340/937 |
| 2010/0245592 | A1 * | 9/2010 | Inui | G06T 7/0018 348/187 |
| 2010/0253539 | A1 * | 10/2010 | Seder | G01S 13/723 340/903 |
| 2012/0287282 | A1 * | 11/2012 | Kinoshita | B60R 1/00 348/148 |
| 2012/0320209 | A1 * | 12/2012 | Vico | B60R 1/00 348/148 |
| 2014/0379197 | A1 * | 12/2014 | Eckert | B60T 7/22 701/28 |

FOREIGN PATENT DOCUMENTS

| | | |
|---|---|---|
| DE | 102007049709 | 4/2009 |
| DE | 102008046214 | 4/2009 |
| DE | 102008004633 | 7/2009 |
| DE | 102008019346 | 9/2009 |
| DE | 102009032542 | 1/2011 |
| DE | 102009057837 | 6/2011 |
| EP | 0 835 796 | 4/1998 |
| EP | 2 312 497 | 4/2011 |
| JP | 09-193691 A | 7/1997 |
| JP | 2000-159019 A | 6/2000 |
| JP | 2004-001658 A | 1/2004 |
| JP | 2011-015353 A | 1/2011 |
| JP | 2011-141854 A | 7/2011 |
| WO | WO 2011/043030 | 4/2011 |
| WO | WO2011/085489 A1 * | 7/2011 |
| WO | WO/2011085489 * | 7/2011 |

OTHER PUBLICATIONS

PCT International Preliminary Report on Patentability including English Translation of PCT Written Opinion of the International Searching Authority for International Application PCT/DE2012/100244, issued Mar. 12, 2014, 7 pages, International Bureau of WIPO, Geneva, Switzerland.

Office Action in German Patent Application No. 10 2011 112 578.0, mailed Mar. 30, 2012, 7 pages, with partial English translation, 5 pages.

Partial English Translation of Japanese Office Action in Japanese Patent Application No. 2014-528853, mailed Jun. 1, 2016, 2 pages.

* cited by examiner

METHOD AND DEVICE FOR AN ASSISTANCE SYSTEM IN A VEHICLE FOR PERFORMING AN AUTONOMOUS OR SEMI-AUTONOMOUS DRIVING MANEUVER

FIELD OF THE INVENTION

The invention relates to a method and a device for an assistance system that serves to perform an autonomous or semi-autonomous driving maneuver of a vehicle, e.g., a parking assistance system in a vehicle.

BACKGROUND INFORMATION

Optical sensor systems, particularly cameras for covering the surroundings of the vehicle, have been increasingly used in vehicles for several years. By means of special electronic devices and software, these systems can take on various functions that assist the driver, which is why such systems are also called assistance systems or driver assistance systems. Some of these assistance systems are already capable of performing autonomous or semi-autonomous driving maneuvers, e.g., performing maneuvers in order to get into and/or out of parking spaces.

For example, a system for assisting the driver when he or she gets into a parking space is known from DE 10 2009 057 837 A1. In that case, the system serves to assist the driver when he or she gets into a parking area of a vehicle garage. The surroundings of the vehicle are covered by means of a camera system. The images of the surroundings are analyzed by means of an image analysis method in order to detect the garage entrance of the vehicle garage. After the detection of the garage entrance, the image of the surroundings is analyzed, by means of a mark recognition method, for at least one mark arranged on a back wall of the garage. After that, the position of the vehicle relative to the garage entrance and the mark is determined and control signals indicating steering angles required for steering the vehicle into the parking area are generated depending on the determined position of the vehicle.

The control signals may be indicated to the driver as steering advice or supplied to at least one control system in order to realize semi-automatic or fully automatic driving of the vehicle into the parking area.

For assistance systems for performing autonomous or semi-autonomous driving maneuvers, sensor systems capable of covering the complete surroundings of the vehicle (panoramic view (360°) around the vehicle) can be used nowadays. The output signals of these sensor systems, which are in the form of detected objects around the vehicle, can be used to perform driver assistance functions. Concerning this, DE 10 2006 036 933 A1 shows a method for generating an overall image from at least two overlapping individual images, wherein cameras arranged on a motor vehicle acquire the individual images and an image processing device puts the individual images together so that the overall image is formed.

Systems as described in DE 10 2006 036 933 A1 are also referred to as top view systems or omnidirectional camera systems. Top view systems typically comprise several (real) image acquisition cameras arranged in or on the vehicle. Image data are generated from various regions of the surroundings of the vehicle by means of said image acquisition cameras and then subjected to different transformations in an electronic image data processing device and a complex image of the complete surroundings of the vehicle is generated, whereby, e.g., a view of the surroundings of the vehicle from a perspective above the vehicle roof (bird's eye view) can be obtained, i.e., the image by a (virtual) camera above the vehicle is generated. The overall image can be continually displayed to the driver of the motor vehicle on a display device in order to, e.g., make shunting or parking maneuvers easier. It is also possible to process/analyze the overall-image data by means of assistance systems for performing autonomous and semi-autonomous driving maneuvers, e.g., for object detection or for the derivation of control commands, e.g., for the control of the vehicle steering gear, gas and brake(s).

However, the process responsibility of assistance systems that serve to perform autonomous or semi-autonomous driving maneuvers, e.g., maneuvers performed in order to get into or out of parking spaces, is especially high. In particular, other road users (e.g., passers-by) must not be endangered and the ego-vehicle or other vehicles must not be damaged. This must be ensured at any time during an autonomous or semi-autonomous driving maneuver.

SUMMARY OF THE INVENTION

It is thus an object of at least one embodiment of the invention to specify a method and a device for an assistance system for performing autonomous and semi-autonomous driving maneuvers, wherein it is ensured that the great demands made on the process responsibility of the assistance system are met and that particularly any danger to people, materials and the environment is largely ruled out.

This object can be achieved by at least one embodiment of a method and a device with features disclosed herein. Advantageous realizations and further developments are disclosed as well, wherein combinations and further developments of individual features are also conceivable.

An underlying idea of at least one embodiment of the invention involves the following: If an assistance system is used that particularly uses a top view system to perform an autonomous or semi-autonomous driving maneuver, the overall image of the surroundings of the vehicle generated from several individual images is processed in order to derive control commands for driving maneuvers and, in addition to that, is used to determine at least one restriction and to put the assistance system in a safe state if there is at least one restriction, wherein, in principle, a restriction may consist in conditions/situations (detected from the image data of the overall image) that would make a safe performance of an autonomous or semi-autonomous driving maneuver more difficult or endanger it. Optionally, further information delivered by internal vehicle sensors may also be used to determine the at least one restriction. Particularly when employing an embodiment of the inventive method or when equipping an embodiment of the inventive device with a top view system, a significant advantage of such an embodiment of the invention involves being able to detect restrictions better and faster on the basis of the overall image of the surroundings of the vehicle, wherein the use of image data of a top view system makes a more dynamic and more flexible reaction to particular environmental conditions or to critical situations possible.

The inventive method is preferably employed in an assistance system that serves to perform an autonomous or semi-autonomous driving maneuver of a vehicle.

In principle, an autonomous or semi-autonomous driving maneuver may be any vehicle driving maneuver in which one, several or all open-loop control and closed-loop control task(s) is/are taken on by the assistance system. Otherwise, when performing the respective driving maneuver manually, the driver has to take on these tasks. Thus, an autonomous or semi-autonomous driving maneuver may also be, in particular, a fully automated driving maneuver, which is performed when the driver is not in the vehicle. The inventive method is particularly employed in an assistance system that serves to perform an autonomous or semi-autonomous maneuver in order to get into or out of a parking space. In this case, a semi-autonomous driving maneuver may be a maneuver performed in order to get into and/or out of a parking space in which the assistance system takes on one or several closed-loop control and open-loop control task(s), e.g., the open-loop control and closed-loop control of the vehicle brake(s) and vehicle steering gear. In this case, an autonomous driving maneuver is preferably a driving maneuver in which the assistance system takes on all open-loop control and closed-loop control tasks that are necessary to move the vehicle from an actual position to a desired position (e.g., parking position), preferably including the closed-loop control/open-loop control of vehicle acceleration (gas).

BRIEF DESCRIPTION OF THE DRAWINGS

In order that the invention may be clearly understood, it will, now be described in connection with example embodiments thereof, with reference to the accompanying drawings, wherein.

DETAILED DESCRIPTION OF EXAMPLE EMBODIMENTS OF THE INVENTION

Figure 1:
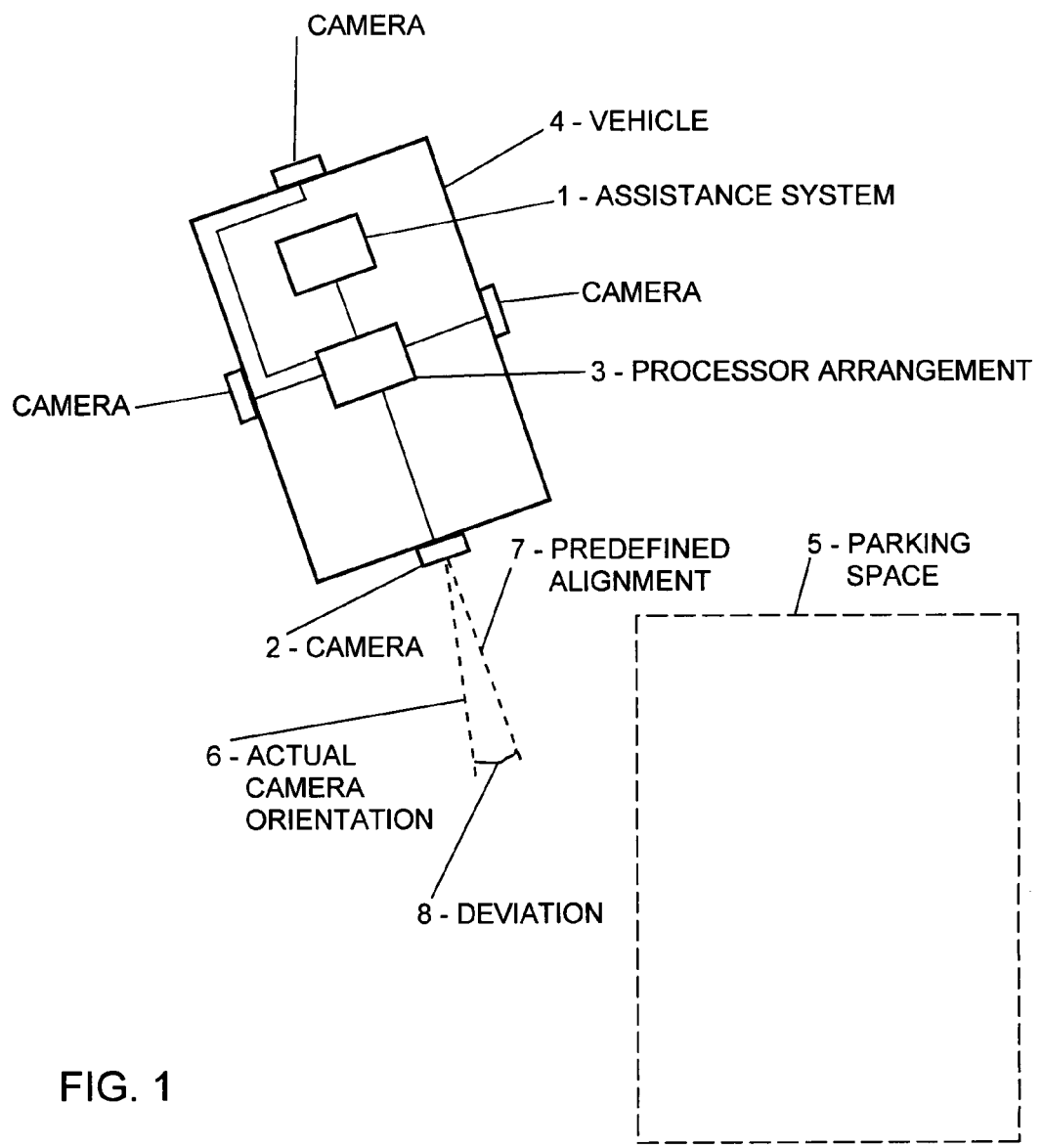
FIG. 1 is a schematic diagram of an embodiment of a system according to the invention in a motor vehicle to be maneuvered autonomously or semi-autonomously into a parking space.

The overall system in which an embodiment of the inventive method is employed preferably comprises a driving assistance system 1, a camera system including one or more cameras 2, and a processor arrangement 3 comprising one or more image processors and/or other processing devices, all installed in or on a motor vehicle 4, as schematically depicted in FIG. 1. By means of a camera 2 of the camera system, image data are generated from the surroundings of the vehicle 4 and are processed in the processor arrangement 3 in order to perform the autonomous or semi-autonomous driving maneuver of moving the vehicle 4 into a parking space 5, wherein the image data are preferably generated by means of several cameras 2 directed toward different regions of the surroundings of the vehicle 4. After that, the image data can be suitably processed by means of image processing devices in the processor arrangement 3 in order to perform the driving maneuver, e.g., in such a manner that objects (such as other vehicles and obstacles) are detected from the image data, the distances to the detected objects are determined, the length and the depth of the parking space 5 are calculated, and the necessary driving maneuver including the required steering angles are derived on the basis of this information. In addition to the camera system, further sensors (such as ultrasonic, radar, lidar, and laser sensors, which are not shown) may be used to detect objects and obstacles and to calculate the length and the depth of the parking space 5.

Figure 2:
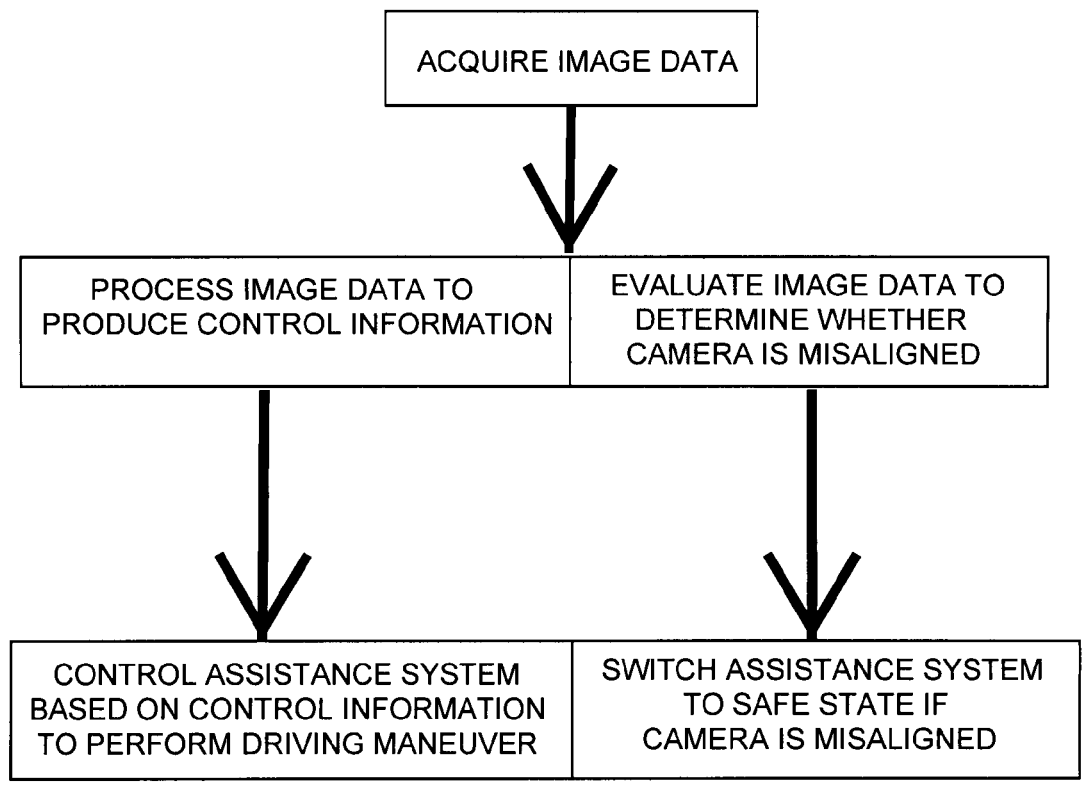
FIG. 2 is a schematic flow diagram of an embodiment of a method according to the invention.

An embodiment of an inventive method for performing an autonomous or semi-autonomous driving maneuver is schematically represented in FIG. 2. In an autonomous or semi-autonomous driving maneuver, the assistance system is preferably put, according to an embodiment of the invention, in a safe state if the image data acquired by means of the camera system 2 and processed by means of the image processing devices 3 show that there is at least one restriction, wherein a restriction may be any restriction that interferes with a safe and correct performance of the respective autonomous or semi-autonomous driving maneuver by the assistance system 1 (in particular, visual restrictions to the camera system and/or restrictions to the assistance system/driving maneuver). In particular, a safely performed driving maneuver is a driving maneuver in which any damages to the vehicle and any danger to people and to the environment (to people in particular) can be largely ruled out. A correctly performed driving maneuver is a driving maneuver in which the open-loop control quantities and closed-loop control quantities calculated in each case are kept to. In particular, a visual restriction to the camera system is a camera system restriction resulting in the fact that a reliable detection of objects (vehicles, obstacles, people, etc.) is not ensured any more. In the illustrated embodiment of the method, the restriction is caused by the camera 2 being incorrectly oriented, e.g. the actual camera orientation 6 deviates 8 from the predefined camera alignment 7. Aside from the detection of the at least one restriction by means of image processing of the image data acquired by means of the camera system, the at least one restriction may be alternatively or additionally detected from information delivered by internal vehicle sensors. In this embodiment of the method, image data is acquired from the camera 2 and is processed in the processor arrangement 3 to produce control information, by which the assistance system 1 is controlled to perform the driving maneuver. The image data is also evaluated to determine whether the camera 2 is incorrectly oriented, and if so then the assistance system 1 is switched to a safe state.

The camera system of the assistance system is preferably a system in which individual images from various regions of the surroundings of the vehicle are acquired by means of several cameras and suitably transformed by means of image processing means in order to generate an overall image of the surroundings of the vehicle thereby. Thus, the camera system is preferably a top view system.

According to a preferred embodiment of the inventive method, the overall image of the surroundings of the vehicle generated by means of the top view system is processed in order to perform the autonomous or semi-autonomous driving maneuver (i.e., particularly in order to derive the open-loop control quantities and closed-loop control quantities for the driving maneuver) as well as in order to detect the at least one restriction. A particular advantage of this realization of the method consists in the fact that all regions in the surroundings of the vehicle may be examined with respect to the presence of a restriction by means of the overall image of the surroundings of the vehicle and that the generated panoramic view facilitates a better, faster and more dynamic/more flexible reaction to various situations occurring prior to and/or during the performance of the driving maneuver.

In particular, a restriction according to the inventive method is present if at least one region of the surroundings of the vehicle is not illuminated at all or is illuminated such that illumination is below a particular brightness threshold value, said surroundings of the vehicle being covered by means of the camera system. For example, no illumination of regions of the surroundings of the vehicle or a degree of illumination thereof that is too low may occur in driving maneuvers that are performed in the evening or at night and/or in garages. In the inventive method, one preferably tries, at first, to specifically illuminate the relevant regions by means of lighting devices of the vehicle, e.g., by activating the vehicle headlights or by switching on additional lights arranged on the vehicle. According to the invention, the assistance system is put in a safe state if the restriction is still present, particularly in spite of specific illumination.

Furthermore, a restriction according to the inventive method is particularly present if an actual camera orientation 6 of at least one camera 2 of the camera system deviates from a defined alignment 7, wherein the defined alignment 7 is preferably the alignment of the camera 2 according to factory configuration or the standard alignment of the camera 2 when the camera system is adjusted correctly.

The fact that one of the cameras 2 is not properly aligned any more may result in the formation of blind corners/blind spots in the generated overall image of the surroundings of the vehicle 4, particularly with top view systems having several individual cameras, each of said cameras being directed toward different regions of the surroundings of the vehicle 4. As a result, objects cannot be reliably detected in the blind spots any more, whereby a safe and correct performance of the respective autonomous or semi-autonomous driving maneuver is not sufficiently ensured any more. According to this embodiment of the invention, the assistance system 1 is put in a safe state in the particular event of a deviation of an actual alignment or orientation 6 of at least one camera 2 of the camera system from a defined alignment 7, wherein the deviation 8 can be directly detected from the generated overall image of the surroundings of the vehicle 4.

Furthermore, a restriction according to further features or embodiments of the inventive method is particularly present if the image data of the camera system show that at least one of the following operating conditions is present:

vehicle door open trunk open hood open vehicle mirror swung out vehicle mirror swung in passengers present in the vehicle people present in the immediate vicinity of the vehicle One or more open vehicle door(s) as well as an open trunk and/or an open hood may interfere with the field of view of one or more camera(s) of the camera system. Moreover, during an autonomous or semi-autonomous driving maneuver, one or more open vehicle door(s), an open trunk and/or swung-out vehicle mirrors may result in collisions of the respective vehicle components with objects in the surroundings of the vehicle, which, in particular, would damage the ego-vehicle. If one or more camera(s) of the camera system is/are integrated, e.g., in the vehicle mirrors of the vehicle or if cameras of the camera system are arranged near side mirrors of the vehicle, swung-in side mirrors may result in the fact that the alignment of cameras of the camera system does not correspond to a correct alignment any more or that the mirrors interfere with or block the field of view of the cameras. People who are present in the immediate vicinity of the vehicle (e.g., within the range of movement or on the intended driving path of the vehicle) or people who are present in the passenger compartment of the vehicle during an autonomous or semi-autonomous driving maneuver may also endanger the safe performance of the driving maneuver. Thus, any of the operating conditions mentioned above may make a safe performance of an autonomous or semi-autonomous driving maneuver impossible. Therefore, according to a preferred realization of the inventive method, the assistance system is put in a safe state if at least one of the operating conditions mentioned above is detected, in particular, directly from the generated overall image of the surroundings of the vehicle. To this end, the overall image of the surroundings of the vehicle may be suitably processed by means of appropriate image processing devices, e.g., by means of image analysis methods, template matching/pattern recognition, etc. According to an optional realization, the presence of the at least one restriction may also be detected by means of information delivered by internal vehicle sensors. In the case of the operating conditions mentioned above, under which a restriction may be present according to the invention, it is possible to use, e.g., internal vehicle sensors to this end—in particular, signals from sensors that are present in the vehicle anyway and that deliver information about, e.g., the state of the vehicle doors (open or not open), the trunk and/or about the state of the hood lock, and/or, e.g., signals from seat occupancy sensors and safety belt locks.

As a preferred result of the putting of the assistance system in a safe state, the assistance system stops the vehicle, preferably by activating the vehicle brake(s).

In particular, putting the assistance system in a safe state may also comprise putting the assistance system and/or the vehicle in a defined initial state, wherein the vehicle may be put, e.g., in an initial position, particularly in its initial position prior to the initiation of the autonomous or semi-autonomous driving maneuver. For example, putting the assistance system in an initial state may consist in aligning one or more camera(s) of the camera system such that its/their alignment corresponds to a defined alignment (standard alignment) or in automatically (re)adjusting the cameras of the camera system. Furthermore, when the vehicle and/or the assistance system are/is put in a defined initial state, the vehicle mirrors of the vehicle may be put in a position required for the driving maneuver, and/or the vehicle doors and/or the trunk of the vehicle may be closed automatically.

In a preferred realization of the inventive method, the driver of the vehicle is signaled that a restriction is present and/or that the assistance system is put in the safe state. For example, signaling may be performed by means of acoustic, visual and haptic signals, wherein signaling devices that are present in the vehicle (e.g., the horn and the direction indicator (or the hazard warning light)) as well as additional signaling devices arranged on/in the vehicle may be used.

The inventive assistance system is preferably arranged in a vehicle and serves to perform an autonomous or semi-autonomous driving maneuver of the vehicle, particularly to perform a maneuver in order to get into and/or out of a parking space. The assistance system particularly comprises a camera system that acquires individual images from various regions of the surroundings of a vehicle by means of several cameras and suitably transforms said individual images by means of image processing means in order to generate an overall image of the surroundings of the vehicle thereby. The camera system is preferably a top view system. According to the invention, the overall image of the surroundings of the vehicle is processed in order to perform the driving maneuver and in order to determine a restriction. Furthermore, according to the invention, the assistance system is designed such that the assistance system is put in a safe state in the event of the presence of a restriction in an autonomous or semi-autonomous driving maneuver (i.e., prior to and/or during the driving maneuver).

The invention claimed is:

1. A method for an assistance system that serves to perform an autonomous or semi-autonomous driving maneuver of a vehicle and in which, by a camera system, image data are generated from the surroundings of the vehicle and processed in order to perform the driving maneuver, characterized in that the assistance system is put in a safe state when at least the image data show that a respective camera alignment of at least one camera of the camera system deviates from a defined alignment.

2. The method according to claim 1, characterized in that the camera system of the assistance system is a system in which individual images from various regions of the surroundings of the vehicle are acquired by several cameras and suitably transformed by image processing devices in order to generate an overall image of the surroundings of the vehicle thereby, and the overall image is processed in order to perform the driving maneuver and in order to determine the camera alignment.

3. The method according to claim 1, characterized in that the assistance system is put in the safe state if additionally at least one region of the surroundings of the vehicle is not illuminated at all or is illuminated below a particular brightness threshold value.

4. The method according to claim 1, characterized in that the assistance system is put in the safe state if additionally at least one of the following operating conditions is present:
vehicle door open
vehicle trunk open
vehicle hood open
vehicle mirror swung out
vehicle mirror swung in
passengers present in the vehicle
people present in an immediate vicinity of the vehicle.

5. The method according to claim 4, characterized in that the presence of the at least one operating condition is detected by image processing of the image data acquired by the camera system.

6. The method according to claim 1, characterized in that in the safe state of the assistance system, the vehicle is stopped.

7. The method according to claim 1, characterized in that in the safe state of the assistance system, the vehicle and/or the assistance system is respectively put in an initial state.

8. The method according to claim 1, further comprising signaling a driver of the vehicle that the camera alignment deviates from the defined alignment and/or that the assistance system has been or is being put in the safe state.

9. An assistance system for performing an autonomous or semi-autonomous driving maneuver of a vehicle, comprising:

a camera system that acquires individual images from various regions of the surroundings of a vehicle by several cameras and suitably transforms said individual images by image processing devices to generate an overall image of the surroundings of the vehicle thereby, and a processor arrangement configured to process the overall image of the surroundings of the vehicle to perform the driving maneuver and to determine a respective camera alignment of at least one camera of the camera system, wherein the processor arrangement is further configured to put the assistance system in a safe state when the camera alignment deviates from a defined alignment.

10. A method of carrying out an autonomous or semi-autonomous driving maneuver of a motor vehicle, comprising:

with a camera mounted on said vehicle, producing image data indicative of surroundings in an environment outside of said vehicle;

in a processor arrangement, evaluating said image data to determine whether said camera is oriented according to or deviating from a predefined alignment;

when said camera is determined to be oriented according to said predefined alignment, processing said image data in said processor arrangement to produce control information, providing said control information to a driver assistance system of said vehicle, and dependent on said control information controlling said vehicle autonomously or semi-autonomously by said driver assistance system to perform said driving maneuver; and when said camera is determined to be oriented deviating from said predefined alignment, blocking or interrupting the autonomous or semi-autonomous control of said vehicle by said driver assistance system, and switching said driver assistance system to a safe state which comprises at least one of: stopping said vehicle, returning said driver assistance system to an initial state thereof, and returning controls of said vehicle to an initial state thereof.

11. The method according to claim 1, wherein the autonomous or semi-autonomous driving maneuver performed by the assistance system is a parking maneuver to get the vehicle into or out of a parking space.

* * * * *